(12) United States Patent
Wang et al.

(10) Patent No.: US 11,650,810 B1
(45) Date of Patent: May 16, 2023

(54) ANNOTATION BASED AUTOMATED CONTAINERIZATION

(71) Applicant: Amazon Technologies, Inc., Seattle, WA (US)

(72) Inventors: Boyu Wang, Milpitas, CA (US); Jiangtao Zhang, Pleasanton, CA (US)

(73) Assignee: Amazon Technologies, Inc., Seattle, WA (US)

( * ) Notice: Subject to any disclaimer, the term of this patent is extended or adjusted under 35 U.S.C. 154(b) by 246 days.

(21) Appl. No.: 16/884,865

(22) Filed: May 27, 2020

(51) Int. Cl.
```
G06F 8/71     (2018.01)
G06F 8/41     (2018.01)
G06F 9/44     (2018.01)
G06F 8/73     (2018.01)
G06F 8/30     (2018.01)
```

(52) U.S. Cl.
CPC .............. *G06F 8/71* (2013.01); *G06F 8/30* (2013.01); *G06F 8/41* (2013.01); *G06F 8/73* (2013.01); *G06F 9/44* (2013.01)

(58) Field of Classification Search
None
See application file for complete search history.

(56) References Cited

U.S. PATENT DOCUMENTS

| | | | |
|---|---|---|---|
| 8,171,482 B1 | 5/2012 | Vlaovic et al. | |
| 8,856,809 B2* | 10/2014 | Curbera | G06F 8/73 717/133 |
| 9,122,562 B1 | 9/2015 | Stickle | |
| 9,971,622 B2 | 5/2018 | Bjorkengren | |
| 10,007,509 B1 | 6/2018 | Qureshi et al. | |
| 10,146,522 B1* | 12/2018 | Sundresh | G06F 8/656 |
| 10,572,294 B1 | 2/2020 | Chawda et al. | |
| 10,871,950 B2* | 12/2020 | De Smet | G06F 8/427 |
| 2011/0088038 A1 | 4/2011 | Kruglick | |

(Continued)

FOREIGN PATENT DOCUMENTS

| | | | | |
|---|---|---|---|---|
| CN | 103399734 A | * | 11/2013 | |
| CN | 109246251 A | * | 1/2019 | ......... H04L 41/5041 |
| JP | 2020187733 A | * | 11/2020 | ......... G06F 17/2247 |

OTHER PUBLICATIONS

Ducasse et al., "Pragmas: Literal Messages as Powerful Method Annotations," ACM, 2016, 9pg. (Year: 2016).*

(Continued)

*Primary Examiner* — Ryan D. Coyer
(74) *Attorney, Agent, or Firm* — Lee & Hayes, P.C.

(57) ABSTRACT

This disclosure describes techniques implemented partly by a service provider network for containerizing applications. In an example, the techniques may include receiving annotated source code of an application to be containerized, analyzing one or more application component annotations included in the annotated source code to determine an application component that is to be included in a container associated with a containerized version of the application, and analyzing one or more method annotations included in the annotated source code to determine one or more methods of the application component to be included in an application programming interface (API) for the container. The container including the application component may then be built and the API for the container may be generated based at least in part on the one or more methods of the application component.

20 Claims, 6 Drawing Sheets

(56) References Cited

U.S. PATENT DOCUMENTS

| | | | |
|---|---|---|---|
| 2012/0290950 | A1 | 11/2012 | Rapaport et al. |
| 2014/0115285 | A1 | 4/2014 | Arcese et al. |
| 2014/0172782 | A1 | 6/2014 | Schuenzel et al. |
| 2015/0113545 | A1* | 4/2015 | Holt .................... G06F 9/45504 719/328 |
| 2015/0379287 | A1 | 12/2015 | Mathur et al. |
| 2016/0330132 | A1 | 11/2016 | Rickey |
| 2016/0350081 | A1 | 12/2016 | Kumar et al. |
| 2016/0378525 | A1 | 12/2016 | Bjorkengren |
| 2017/0052772 | A1 | 2/2017 | Chen et al. |
| 2018/0025160 | A1 | 1/2018 | Hwang et al. |
| 2018/0167480 | A1* | 6/2018 | Jain .......................... H04L 67/10 |
| 2018/0373505 | A1* | 12/2018 | Engquist ................... G06F 8/40 |
| 2019/0042320 | A1* | 2/2019 | Prince .................... G06F 9/5077 |
| 2019/0087118 | A1 | 3/2019 | Makin et al. |
| 2020/0019388 | A1* | 1/2020 | Jaeger ........................ G06F 8/36 |
| 2020/0117576 | A1 | 4/2020 | Karukuri et al. |
| 2020/0249936 | A1* | 8/2020 | Barfield, Jr. .............. G06F 8/60 |
| 2020/0272440 | A1 | 8/2020 | Burgazzoli et al. |

OTHER PUBLICATIONS

Santos et al., "Design annotations to improve API discoverability," Elsevier, 2017, 17pg. (Year: 2017).*

Tryfonos et al., "Unicorn Libraries, IDE Plugin, Container Packaging and Deployment Toolset Early Release Deliverable D2.1," 2018, 75pg. (Year: 2018).*

Liu, et al, "A Toolset for Detecting Containerized Application's Dependencies in CaaS Clouds", 2018 IEEE 11th International Conference on Cloud Computing (CLOUD), Jul. 2-7, 2018, pp. 194-201.

Office Action for U.S. Appl. No. 16/574,850, dated Jan. 21, 2022, Zhang, "Identifying Dependencies for Processes for Automated Containerization", 16 pages.

Office Action for U.S. Appl. No. 16/574,782, dated Oct. 7, 2020, Zhang, "Identifying Cooperating Processes for Automated Containerization", 26 Pages.

Office Action for U.S. Appl. No. 16/574,782, dated May 26, 2021, Zhang, "Identifying Cooperating Processes for Automated Containerization", 30 pages.

Office Action for U.S. Appl. No. 16/574,782, dated Nov. 2, 2021, Zhang, "Identifying Cooperating Processes for Automated Containerization", 32 pages.

Brookes, et al., "GenApp, Containers and Abaco: Technical Paper," PEARC '19: Proceedings of the Practice and Experience in Advanced Research Computing on Rise of the Machines (learning), Jul. 28-Aug. 1, 2019, Article No. 12, pp. 1-8.

Pathirathna, et al., "Security Testing as a Service with Docker Containerization," 2017 11th International Conference an Software, Knowledge, Information Management and Applications (SKIMA), IEEE, Dec. 2017, 7 pages.

* cited by examiner

ANNOTATION BASED AUTOMATED
CONTAINERIZATION

BACKGROUND

Service provider networks offer network-based services to fulfill users' computing-service needs without the users having to invest in and maintain computing infrastructure required to implement the services. These service provider networks may provide network-based computing resources on an as-needed basis. For example, a service provider network may permit users to purchase and utilize computing resources such as virtual machine ("VM") instances, data storage resources, database resources, networking resources, network services, and other types of computing resources. Users may configure the computing resources provided by a service provider network to implement desired functionality, such as to provide a network-based application or another type of functionality.

Many users continue to maintain legacy software applications that have been built and adapted over many years. These legacy software applications might be built, configured, and deployed using different processes, which may require a significant amount of operational burden and may possibly hinder and/or prevent the customer from developing new business. Also, many of these legacy software applications are executing on systems that are no longer supported or are nearing an end of their support and, as a result, need to be re-platformed in the near future.

However, migrating legacy applications from on-premise systems to computing resources provided by a service provider network can be complex, operationally intensive, and time-consuming. For example, in order to utilize the computing resources provided by a service provider network, the user may need to prepare and provide a version of the legacy software applications currently running on the user's on-premise systems that is self-contained (referred to herein as containerized). For example, the legacy software applications may be containerized into container images and task definitions and scheduled to run in the computing resources of the service provider network. In some examples, such a containerized application may allow the service provider network to scale up or down the computing resources allocated to the user's application (e.g., by increasing or decreasing the number of VM instances running the containerized application). Preparing for such a version may be beyond the capabilities or resources of users.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
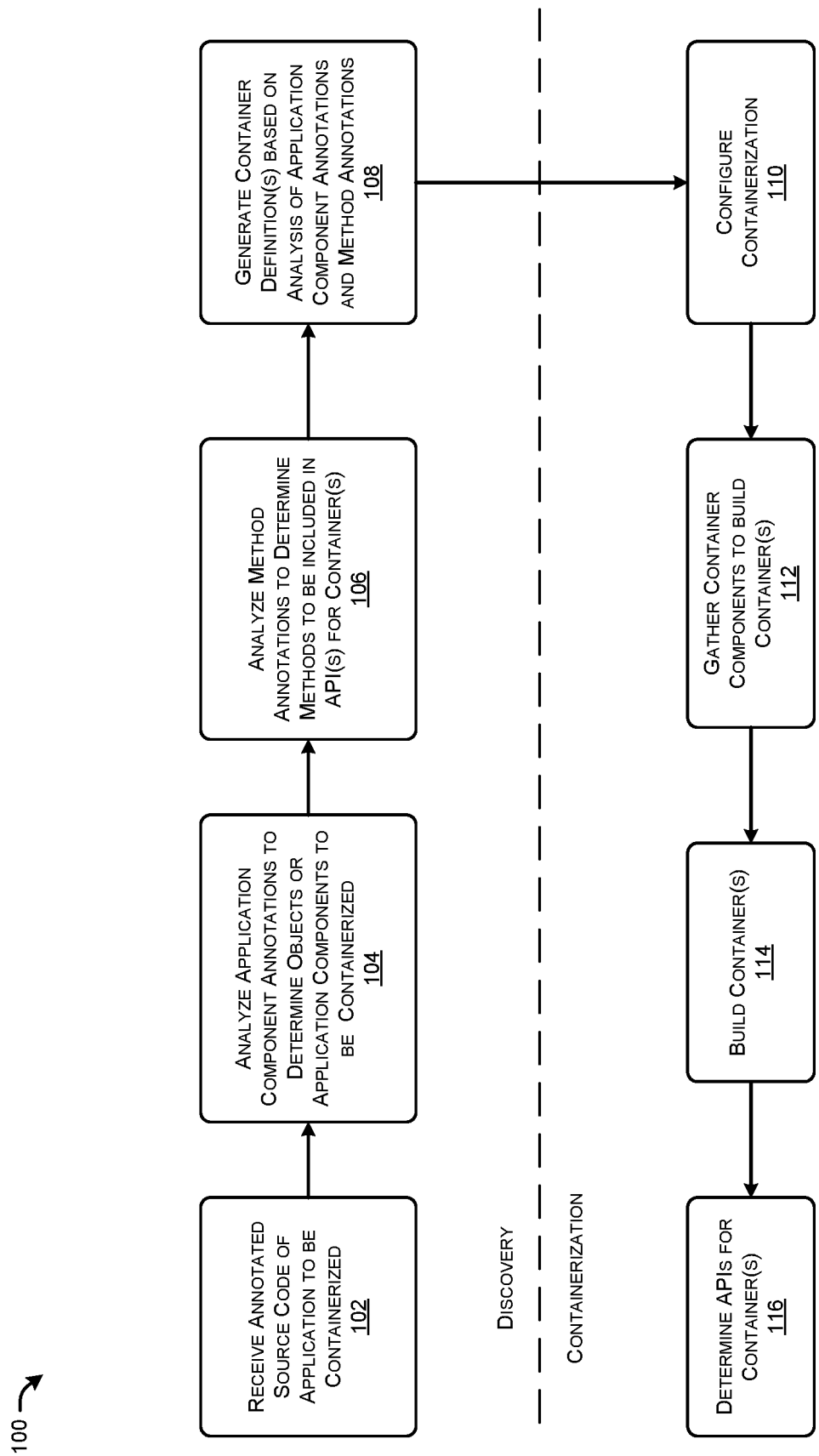
FIG. 1 illustrates a flow diagram of an example process performed by a service provider network to containerize an application.

This disclosure describes, at least in part, techniques for providing automated, partially automated, or assisted containerization of applications. More particularly, a containerization service (CS) described herein may provide a more efficient and faster way for users of service provider networks to containerize legacy applications such that the legacy applications are seamlessly deployable to the service provider network. Some techniques according to this disclosure may perform containerization based on various forms of annotations in source code, retained in compiled byte-code, and/or retained at run time.

In some examples, the annotation based containerization techniques disclosed herein may provide for the automated, partially automated, or assisted breaking up of monolithic legacy applications into, for example, a container based microservice architecture.

For example, some objects or application components (both hereinafter referred to as application components) may include annotations that indicate the annotated application component includes at least part of the application programming interface (API) for a container of the containerized monolithic application. Further, annotations associated with methods or functions (both hereinafter referred to as methods) may indicate the method is to be exposed as part of the API for the container. Using these, additional and/or alternative annotations, one or more containers may be created for the monolithic application being containerized and respective APIs may be determined for each container. By doing this, a user may decompose the monolithic legacy application into different microservice units or containers that can be leveraged by other applications or the other microservice units or containers of the containerized application itself.

Service provider networks, such as cloud-based service provider networks, may provide network-based computing resources on an as-needed basis. A service provider network, "provider network" or "cloud," may refer to a large pool of accessible virtualized computing resources (such as compute, storage, and networking resources, applications, and services). The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in service provider data centers that provide those services.

For example, a service provider network may permit users to purchase and utilize scalable computing resources such as virtual machine ("VM") instances, data storage resources, database resources, networking resources, network services, and other types of computing resources. Generally, users register for users accounts with the service provider network and purchase, or otherwise reserve, a number of machine instances required to serve (e.g., process, execute, etc.) a maximum number of concurrent requests. For example, a user may request that the service provider network reserve or allocate VM instances to be readily available to be spun up, or called, to serve a maximum number of concurrent requests that are served at least partially at a same time. While the techniques described herein are equally applicable to any computing instance, machine instance, or computing resource, the techniques are herein described with reference to VM instances executing containerized applications (referred to hereafter as containers). Non-limiting examples of service provider networks include Amazon's Elastic Container Service (ECS) and Elastic Kubernetes Service (EKS). These service provider networks may provide containerization services which may be improved using the techniques disclosed herein for providing automated, partially automated, or assisted containerization of applications. For example, legacy software applications may be containerized into container images and task definitions and scheduled to run in ECS or EKS managed clusters (including one or more VM instances). In some embodiments, the containerized application may not run on the VM directly. For example, a container layer, such as Docker, Inc.'s Docker, may be provided between the application and VM operating system.

Docker is a set of platform as a service (PaaS) products that may use OS-level virtualization to deliver software in packages called containers. Containers may be isolated from one another and may bundle their own software, libraries and configuration files. The containers may communicate with each other. One or more containers may be run by a single operating system kernel and therefore may use fewer resources than virtual machines.

As mentioned above, deploying a containerized application on a service provider network such as ECS and EKS may allow the service provider network to scale up or down the computing resources allocated to the user's application (e.g., by increasing or decreasing the number of container instances running the containerized application).

In general, a process is an instance of a computer program that is being executed by one or many threads. It contains the program code and its activity. Depending on the operating system (OS), a process may be made up of multiple threads of execution that execute instructions concurrently. As such, while a computer application is a passive collection of instructions, a process is the actual execution of those instructions. Several processes may be associated with the same application. For example, opening up several instances of the same program often results in more than one process being executed. In another example, a process may spawn a child process to perform a subtask on behalf of the parent process (e.g., the process spawning the child process).

A container, as referred to herein, packages code and all its dependencies so that an microservice unit (also referred to as an application or a task) can run quickly and reliably from one computing environment to another. A container image is a standalone, executable package of software that includes everything needed to run a microservice unit: code, runtime, system tools, system libraries, and settings. In the case of an a microservice unit that includes multiple related processes, such as parent-child processes, the container may include everything needed to run each of the related processes. Container images become containers at runtime. Containers are thus an abstraction of the application layer (meaning that each container simulates a different a microservice unit). Though each container runs an isolated a microservice unit, multiple containers can share a common operating system, for example by being launched within the same virtual machine. A containerized application may include one or more container images or containers. In examples in which the containerized application includes a plurality of container images or containers, the APIs of each container may provide an interface to the functionality of the respective container to other applications or other containers of the same containerized application.

In contrast, virtual machines are an abstraction of the hardware layer (meaning that each virtual machine simulates a physical machine that can run software). Virtual machine technology can use one physical server to run the equivalent of many servers (each of which is referred to as a virtual machine). While multiple virtual machines can run on one physical machine, each virtual machine typically has its own copy of an operating system, as well as the applications and their related files, libraries, and dependencies. Virtual machines are commonly referred to as compute instances or simply "instances." Some containers can be run on instances that are running a container agent, and some containers can be run on bare-metal servers.

A service provider network may manage large fleets of VM instances, which may be simulations of physical machines, such as a workstation or a server, that run on hosts that support virtualization. Each VM instance that is allocated or designated for a user may store a container, or a portable software environment for applications (or other software) to easily run and scale to process a request from a user. These containers may be portable in that they are capable of being migrated between VM instances. In some examples, a single VM instance may include one container that executes software or applications to process requests received for a user account. However, in some examples a VM instance may contain multiple containers to process multiple requests depending on the VM instance.

As mentioned above, the techniques described herein may provide automated, partially automated, or assisted containerization of applications (e.g., monolithic legacy applications). In particular, users may begin containerization of their legacy applications as the first step towards modernization of their systems. Such modernization may reduce their operation overhead and compute cost, increase development and deployment agility, and provide standardization of builds across the user's systems. Users may perform modernization to resolve a technical debt and leverage modern technologies to create new customer experiences. However, such efforts, including efforts to containerize applications may stall due to various problems, such as the example problems discussed below.

First, legacy applications may be monolithic, hugely intertwined with complex application interdependency developed over a period of time and oftentimes, may be poorly documented. Many times, these legacy applications may be co-hosted in the same environments and without modern isolation and security considerations. As such, changes to one legacy application may negatively affect other applications despite appearing to be unrelated. Similarly, when migrating such legacy applications to cloud services, application interdependencies may create difficulties when poorly understood, for example, due to lack of documentation and loss of expertise.

Second, users may have limited technology budgets and have to allocate funds between developing new systems and modernizing existing systems. However, in many cases, the allocation of funds may heavily favor developing new systems and functionalities while the modernization budget is neglected. For example, users tend to prioritize delivering new capabilities in both legacy and new applications to respond to changing business requirements. Because of this, while users wish to invest time and resources to upgrade their legacy applications, funding realities slow progress.

Moreover, a technical expertise mismatch may develop within the IT departments of users. For example, one set of users may have IT departments with technical expertise with modern technologies while lacking expertise and skills relating to legacy applications. Similarly, another set of users may have expertise with legacy applications and related technologies but may lack expertise with respect to more modern technology. For instance, an IT department may have failed to retrain and acquire skillsets related to such modern technologies.

The techniques and systems described herein may provide functionality that may utilize annotations to automate or assist in containerizing applications while reducing the complexity of containerizing monolithic legacy applications. Such an automated tool may make the modernization easier and quicker than the huge manual efforts otherwise needed.

In some examples, the users or developers of a legacy application may annotate the source code of some application components. For example, a user may utilize an annotation library which may include annotation definitions and API mapping function(s) (e.g., static API mapping and/or dynamic API mapping). More particularly, the user may import the library into the application source code and then, using or based on the annotation library, insert annotations into the application components (e.g., classes) and methods or function code thereof.

Once annotated, the source code of some application components may include annotations that indicate the annotated application component includes at least part of the application programming interface (API) for a container of the containerized monolithic application and/or may indicate the annotated application component is primary functionality of the associated container or microservice unit. In some examples, the application components may include classes such as Java classes. Annotations of this type may be referred to as "Annotation A" herein. In some examples, these annotations may include some or all of the information to produce a container image. For example, in the case of Docker, collectively, annotation A annotations for one or more application components to be included in a container may include information to produce the DockerFile such as dependencies (e.g., other objects or components), a Java Developer Kit (JDK) version, an application server type, port and other configuration information and so on.

Further, some annotations associated with methods may indicate that the method is to be exposed as part of the API for an associated container. Annotations of this type may be referred to as "Annotation B" herein. In some examples, the API generated using the Annotation B annotations may be used to generate a client software developer kit (SDK) for the container.

Regardless of annotation type, some annotations may be tagged to identify an associated microservice unit or container. For example, where the annotations for a monolithic legacy application are to designate four microservice units or containers into which the monolithic legacy application is to be decomposed, annotations may be tagged as "microservice 1," "microservice 2," "microservice 3," and "microservice 4." Application components including annotations with the tag "microservice 1" may be included in the container for microservice 1, application components including annotations with the tag "microservice 2" may be included in the container for microservice 2, and so on.

Using these, additional and/or alternative annotations, one or more containers may be created for the monolithic application being containerized and respective APIs may be determined for each container. By doing this, a user may decompose the monolithic legacy application into different microservice units or containers that can be leveraged by other applications or the other microservice units or containers of the containerized application itself.

Upon receiving annotated source code for an application to be containerized, the systems and techniques disclosed herein may analyze the annotations at various stages. For example, the systems and techniques disclosed herein may analyze annotations that are retained in compiled byte-code, retained at run time, or analyze the annotations in the source code directly.

Taking Java annotations as an example, annotations may be analyzed at three stages based on retention policies for Java annotation, (1) CLASS (e.g., compiled byte-code retention), (2) RUN-TIME, and (3) SOURCE. As mention above, systems and techniques disclosed herein may use any type of retention policies. CLASS and RUN-TIME retention types of annotations may be built into binary byte-code and analyzed through scanning the binary byte-code annotations to get the annotation specified information. In the case of SOURCE retention types of annotations, the systems and techniques disclosed herein may analyze the annotations through source code analysis tools to get the annotations.

In examples in which annotations retained by compiler in byte code are utilized, a post compiling parser function may be invoked using compiled standalone binary as input (e.g., byte-code binaries). For example, a byte-code parser may scan the compiled byte code. The scanning may read all the class and method annotations to get the annotations A and B. The classes including annotation A may be identified as primary functionality of the associated container or microservice unit. Methods annotated with annotation B within the classes annotated with annotation A may be identified as methods to be exposed by the container or microservice unit APIs. In some examples, retrieval and/or analysis of CLASS and RUN-TIME retention policy annotations in the standalone may be performed by using a library such as the Apache BCEL (Binary Code Engineering Library). Containerization of the application may then be performed based on the retrieved information. More particularly, the container image may be built from classes annotated with annotation A and their dependencies and API model generation may be implemented based on methods annotated with annotation B. Further, a client SDK library may be generated based on the API model. During application launch, the container and the API model may be loaded into memory. Clients may then use the client SDK library to interface with the API model and, by extension, the container. In an example, as discussed above, the containerization of the application using an annotation library may insert functionality into the application (e.g., embed a function) that may serve as an API access point usable by the API model and/or a client SDK library to allow clients to interface with the container.

In examples in which annotations are retained in RUN-TIME, the container images and a API model may be generated in the same or a similar manner to that discussed above for byte-code annotations. During or after application launch, the container and the API model may be loaded into memory. In the case of annotations retained in RUN-TIME, in addition to or as an alternative to loading the API model into memory, memory scanning may be performed during or after application launch (e.g., upon receipt of an API call) to dynamically map API calls to exposed methods. In some examples, the functionality to scan and dynamically map API calls to exposed methods at RUN-TIME may be embedded into the compiled byte-code from an annotation library. Clients may then use the client SDK library to interface with the container using the API model and/or the dynamically mapped API calls.

In examples in which the source code is analyzed directly to get class and method annotations, a source code analysis tool may be utilized to get the annotations. For example, a tool such as ANother Tool for Language Recognition (ANTLR) may be utilized to generate an Abstract Syntax Tree (AST) which may in turn be analyzed. Some other example tools include other analyzers, such as Java Parser (https://github.com/javaparser/javaparser) and Roslyn (https://en.wikipedia.org/wiki/Roslyn_(compiler)). The AST may be traversed to get all the annotations. The annotations may then be utilized to build the container image and generate the API model for each microservice unit or container in a similar manner as discussed above for annotations retained in byte-code. As with CLASS and RUN-TIME retained annotations, during application launch, the container and the API model may be loaded into memory. Clients may then use the client SDK library to interface with API model and, by extension, the container.

Implementations are not limited to the use of one type of annotation retention or discovery. Rather, some examples may utilize two or more types of annotation analysis based on annotations analyzed at different stages.

As mentioned above, once annotations A and B have been identified and analyzed, the container images and an API model may be generated. Using Docker containers as an example, building the container image may include creating a container work is created. Jar files may be generated classes including annotation A and for any dependencies. Depending on the implementation, the dependencies may be identified using information from annotation A annotations, additional annotations or through additional analysis (e.g., sandbox or other dependency detection). Examples of dependency detection are discussed in U.S. patent application Ser. No. 16/574,782, which is incorporated by reference herein in its entirety.

The DockerFile may then be created in the workspace. In some examples, a user may review and/or modify the generated DockerFile to ensure proper function. For example, the user may specify the entry point, expose certain ports and/or add environment variables, and so on. Once done, a Docker image may be built from within the workspace and used to build the microservice unit on any container framework like AWS ECS.

While the techniques described herein are with reference to containers operating on VM instances, the techniques are equally applicable to any type of computing resource that has multiple instances or occurrences for processing concurrent commands or requests. For example, the techniques are equally applicable to a messaging service that receives messages, stores them in a queue, and processes concurrent requests for user accounts to retrieve and send those messages to other devices. These and other variations may be envisioned based hereon.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a flow diagram of an example method 100 performed by a service provider network to containerize an application based on code annotations in accordance with some embodiments herein. More particularly, the illustrated flow diagram shows the general operations of an example containerization method 100 occurring in two phases, a discovery phase (e.g., operations 102-108) and a containerization phase (e.g., operations 110-116).

At 102, a containerization service may receive annotated source code of the application to be containerized. In some examples, the annotated source code may be provided by the user. In some examples, the users or developers of a legacy application may annotate the source code of some application components. For example, a user may utilize an annotation library which may include annotation definitions and an API mapping function. More particularly, the user may import the library into the application source code and then, using or based on the annotation library, insert annotations into the application components (e.g., classes) and methods or function code thereof. For example, the containerization service may receive Java source code including one or more annotations. As discussed above, annotations may indicate the application is to be containerized as multiple microservice units or containers that may cooperate to perform the functionality of the application to be containerized. To containerize these applications, components or artifacts of each container must be migrated while preserving the dependencies, interoperation, and APIs of the application in the containerized form.

At 104, the containerization service may analyze application component annotations to determine application components to be containerized (e.g., annotation A annotations). For example, the containerization service may analyze the annotations to identify application components. For example, the annotations may indicate the identified application components include at least part of the application programming interface (API) for an associated container of the containerized monolithic application and/or the are primary functionality of the associated container or microservice unit. In some examples, the application component annotations may include some or all of the information to produce a container image. For example, the application component annotations may include information to produce the container image such as a developer kit version, an application server type, port and other configuration information, and so on.

At 106, the containerization service may analyze method annotations to determine methods to be included in the API of the associated container or microservice unit (e.g., annotation B annotations). For example, one or more methods of a Java class annotated with an annotation A annotation may be annotated (e.g., with annotation B annotations) for inclusion in the API of the associated container or microservice unit. The containerization service may identify the methods annotated with annotation B annotations. In some examples, the analysis of method annotations may be limited to method annotations included in methods of application components already determined to include annotations indicating that the annotated application components include at least part of the application programming interface (API) for an associated container and/or that the annotations indicate are primary functionality of the associated container or microservice unit (e.g., annotation A annotations).

As mentioned above, application component annotations and method annotations may be associated with tags that identify an associated microservice unit or container associated with annotation and the application component or method.

At 108, the containerization service may generate container definitions based on the analysis of the application component annotations and method annotations. For example, a container definition may designate a purpose for the container, components to be included in the container and methods to be exposed by the API of the container.

At 110, the containerization service may perform containerization configuration based on the final container definition(s). In some examples, the containerization configuration may set forth information for the running of the produced container(s) or microservice unit(s), such as the amount of memory needed, the number of instances of a container that should be executed, the port numbers that should be used, and so on. Optionally, the user may be presented with a report of the final container definition and containerization configuration and be provided with an opportunity to make manual changes via a UI. For example, the user may update the container configuration to modernize both the legacy software components and middleware to be included in the container.

At 112, based on the container definition(s) and containerization configuration, the containerization service may gather components to build the container(s) or microservice unit(s). Example components include executable files, configuration files, libraries, and binaries.

At 114, the containerization service may use metadata (e.g., the container definition and any other information derived from the discovery phase) and the components gathered at 112 together with the containerization configuration to build a container image for the container or microservice unit. Though details are implementation specific, in general, the containerization service may build the container image by generating a standalone, executable package that includes everything needed to run the microservice unit including the executables, dependencies and configuration information (e.g., code, runtime, system tools, system libraries, and settings).

At 116, the containerization service may generate API(s) or API model(s) for the container(s) based on the respective container definition(s) and/or the analysis of the method annotations. For example, an API model may be generated based on the input and output parameters of the annotated methods to be exposed by the API of the container or microservice unit. The APIs of each container may provide an interface to the functionality of the respective container to other applications or other containers of the same containerized application. In some examples, API models may be in XML or JSON formats. Further, in some examples, API model(s) may be used to generate SDK(s) for the container(s).

The container image may then be launched and tested. For example, the user may specify test scripts or standard application-specific tests to confirm that the generated container image is functional.

Once tested, the containerization process may be repeated, in whole or in part, or the container image may be provided to the user (e.g., stored in a storage location of the service provider network associated with the user).

Figure 2:
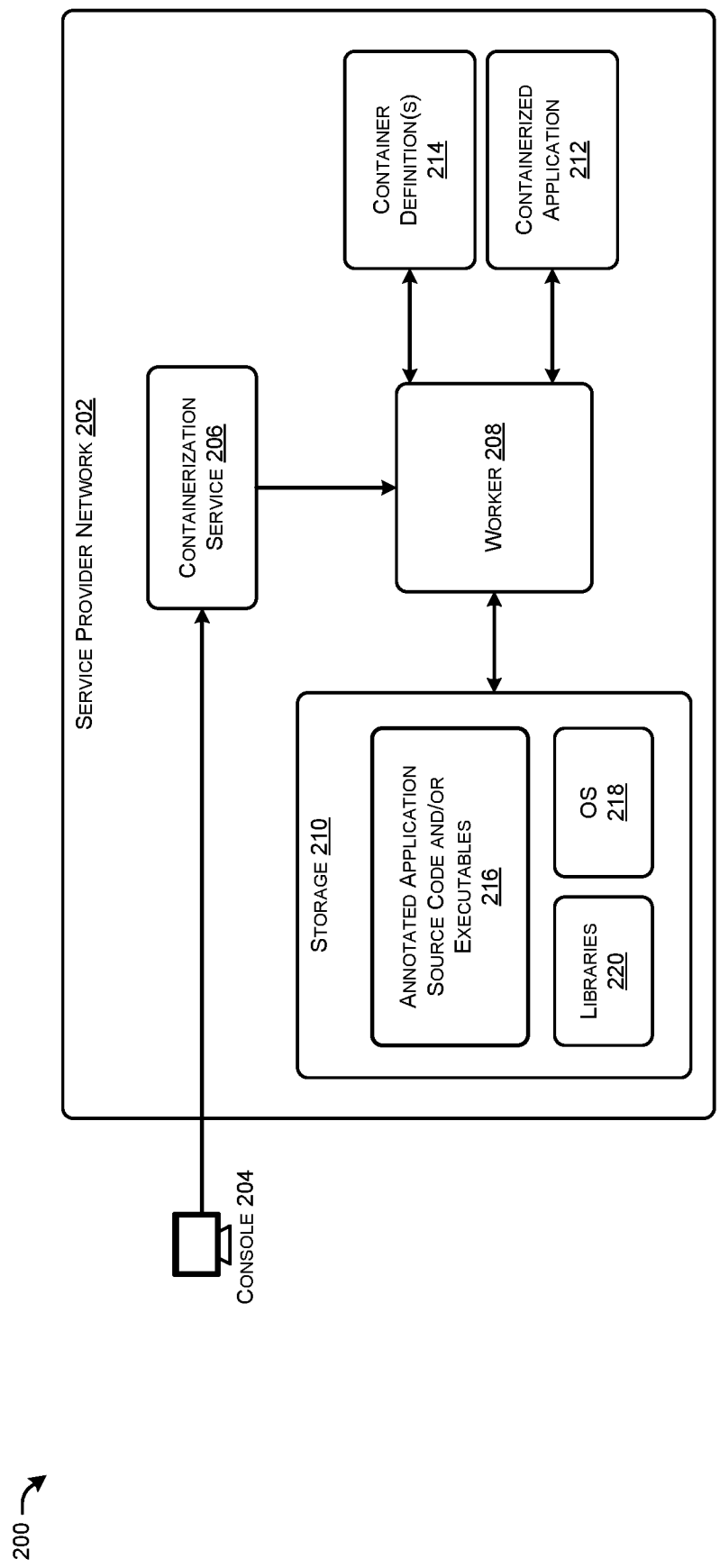
FIG. 2 illustrates a system-architecture diagram of an example environment in which a service provider network may provide for the containerization of applications.

FIG. 2 illustrates a system-architecture diagram of an example environment 200 in which a service provider network 202 may provide for the containerization of applications based on annotated source code in accordance with some embodiments. As illustrated, the environment 200 further includes a console 204.

In summary, the service provider network 202 includes a containerization service 206 that may orchestrate the operation of at least one containerization worker 208 that generates a containerized application 212 including one or more containers or microservice units. One or more container definitions 214 may be generated based on annotated application source code and/or executables 216 stored in storage 210. The one or more containers may be generated based on one or more container definition(s) 214 and the annotated application source code and/or executables 216, OS 218 and/or libraries 220. Additional discussion of the operation of the worker 208 is provided below with regard to FIGS. 3-5.

The storage 210 may include an operating system 218 in which applications may be executed. An operating system (OS) may be system software that manages computer hardware and software resources and provides common services for applications. The application executables 216 may utilize computer hardware and software resources through requests or calls to the operating system 218 and one or more libraries 220 on a system. Libraries 220 may be a collection of non-volatile resources used by applications. These may include configuration data, documentation, help data, message templates, pre-written code and subroutines, classes, values or type specifications.

The console 204 may be a user interface to the containerization service 206 presented on a user device, a hardware device associated with the service provider network or any other computing device. In operation, the console 204 may provide a user with an interface to the containerization service 206. Through the user interface, the user may request containerization of applications, provide or modify the container definition(s) and/or any other configuration information, and receive status information. Additionally, the console 204 may provide the user with deployment controls that allow the user to deploy a resulting containerized application into use.

The containerization service 206 may operate to orchestrate the discovery and containerization phases of the method 100 discussed above with regard to FIG. 1. More particularly, the containerization service 206 may interact with the user of the console 204 and may control the one or more workers 208 to perform the operations of the discovery and containerization phases of the method 100 to containerize the applications using the annotated application source code and/or executables 216. Each worker 208 may be a subordinate process created by the containerization service 206 upon receipt of a containerization request. However, while shown in FIG. 2 as separate entities, the containerization service 206 and the workers 208 may be a single entity in some implementations. In addition, the containerization service 206 or the service provider network 202 may include a database which persists user information, application metadata, and containerization task information.

The worker 208 may generate a containerized application 212 based on the container definition(s) 214 that may result from analysis of the annotated application source code and/or executables 216, for example, in the manner discussed above with regard to FIG. 1 and below with regard to FIGS. 3-5.

While discussed herein as being performed by and/or at a service provider network, in other examples, the containerization service may instead or additionally be implemented as a standalone tool or a hybrid thereof. For example, a user or developer may obtain the standalone tool and an annotation library. The user may then annotate the source code of the application to be containerized before utilizing the containerization tool to generate a containerized version of the application as discussed above. Then, the user may deploy the containerized application to a service provider network or another location for execution and/or usage. Many other variations are possible.

Figure 3:
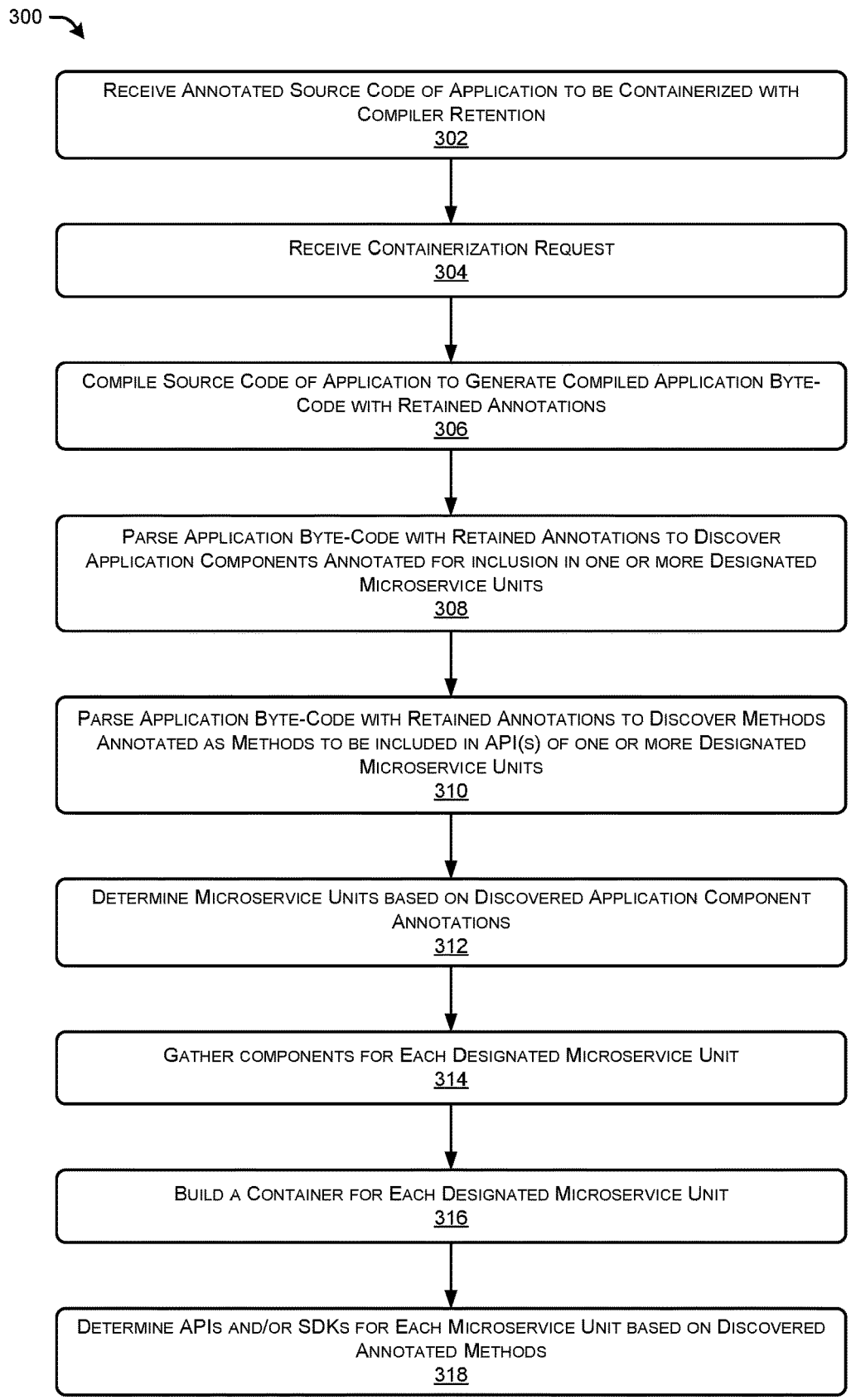
FIG. 3 illustrates a flow diagram of an example process performed by a service provider network for application containerization based on annotations retained in compiled byte-code.
Figure 4:
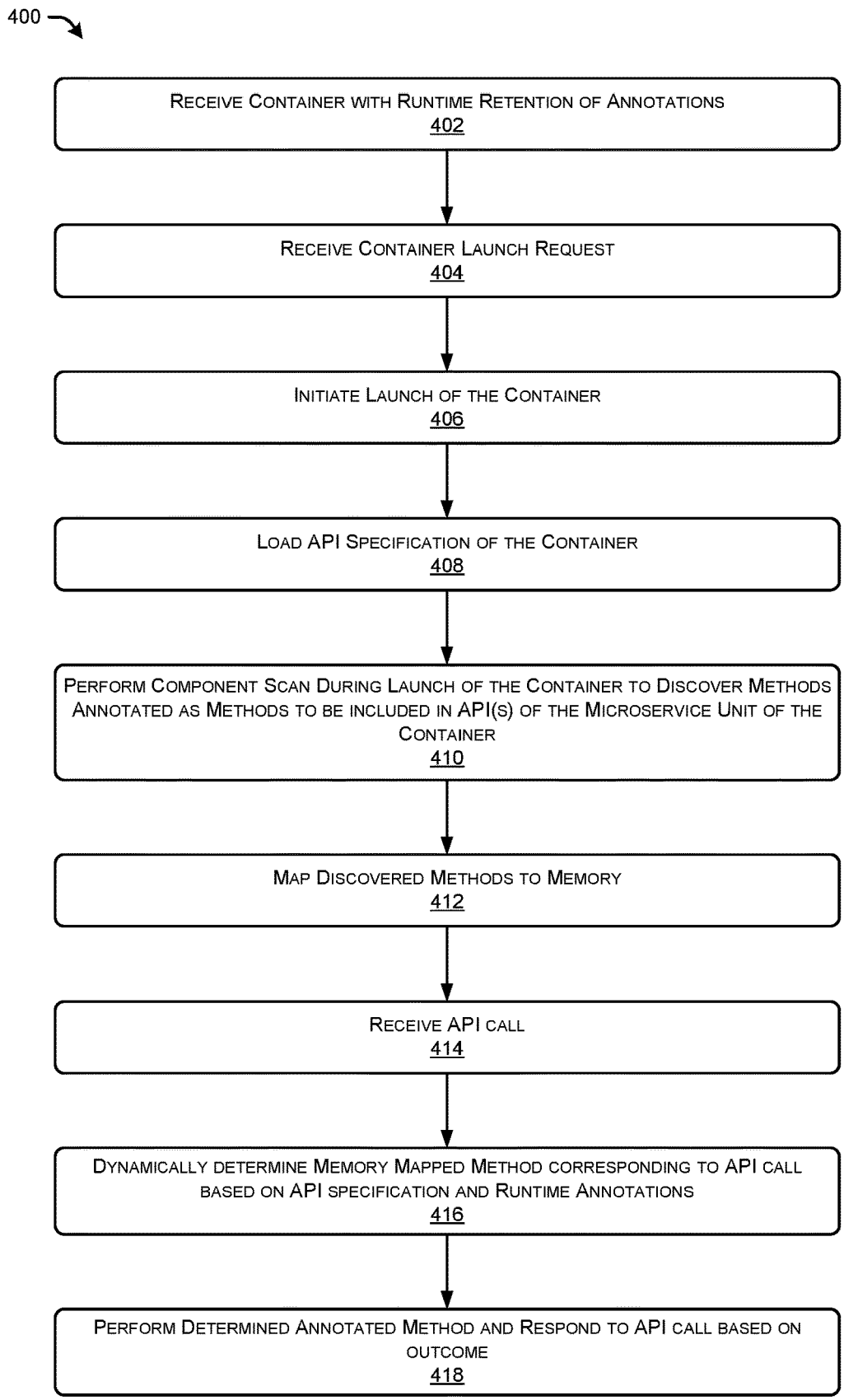
FIG. 4 illustrates a flow diagram of an example process performed by a service provider network for application containerization based on annotations retained in during run-time.
Figure 5:
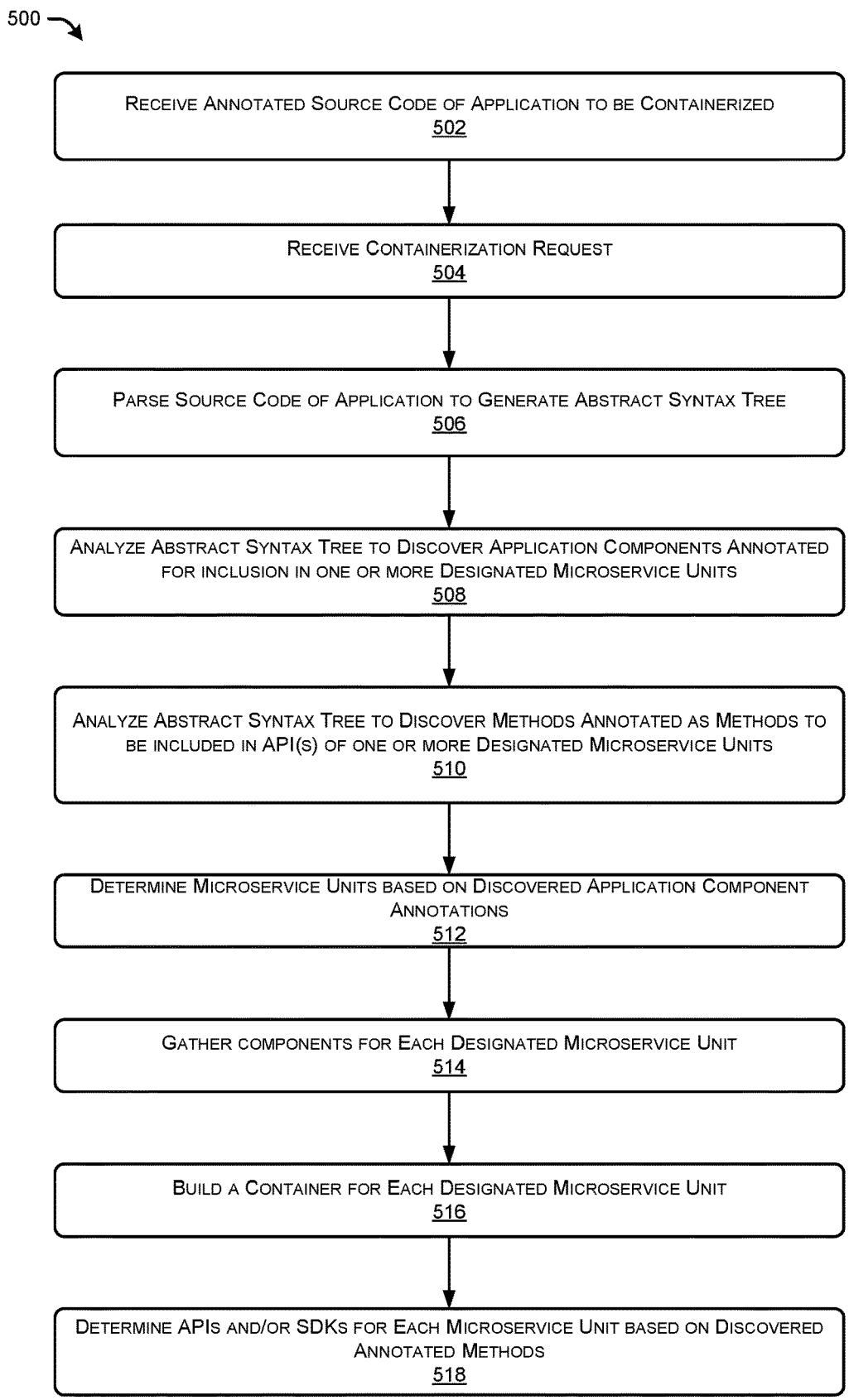
FIG. 5 illustrates a flow diagram of an example process performed by a service provider network for application containerization based on a source code analysis of annotated source code.

FIGS. 3-5 each illustrate an example process for containerization based on annotations. In particular, in the process of FIG. 3, annotations retained in compiled byte-code of an annotated application is utilized, while the process of FIG. 5 utilizes source code analysis to discover and analyze annotations in the annotated application source code directly. The process of FIG. 4 utilizes annotations retained in a container of a containerized application at and during runtime to dynamically generate/update the API of the container.

FIG. 3 illustrates a flow diagram of an example method 300 performed by a service provider network for application containerization based on annotations retained in compiled byte-code according to some embodiments herein.

At 302, the containerization service 206 may receive annotated source code of an application to be containerized with annotations specifying a compiler retention policy for annotations (e.g., that annotations be retained in the compiled byte code). In some examples, the containerization service 206 may store the received annotated source code at 216. At 304, the containerization service 206 may receive a containerization request via the console 204. For example, containerization request may designate the received annotated source code of the application to be containerized and initial information about the containerization.

At 306, the annotated source code may be compiled to generate compiled application byte-code with retained annotations. In particular examples, the containerization service 206 may provide the containerization request to a worker 208 for performance or configure a worker to perform the containerization request. The worker 208 may then perform the compilation of the annotated source code of the application to be containerized.

At 308, the worker 208 may parse the compiled application byte-code with retained annotations to discover application components annotated for inclusion in one or more designated microservice units. As discussed above, annotations may designate microservice units using a label or tag (e.g., "microservice 1," "microservice 2," etc.). In some examples, annotations that designate application components for inclusion in one or more designated microservice units may indicate that the annotated application component includes at least part of the application programming interface (API) for a container of the containerized monolithic application and/or may indicate that the annotated application component is primary functionality of the associated container or microservice unit. The parsing of the compiled application byte code may be performed as discussed above with regard to FIG. 1. For example, retrieval and/or analysis of annotations in the byte-code may be performed using a library such as the Apache BCEL (Binary Code Engineering Library). In some examples, the annotations that designate application components for inclusion in one or more designated microservice units may also include information to produce the container image such as dependencies (e.g., other objects or components), a developer kit version, an application server type, port and other configuration information and so on.

At 310, the worker 208 may parse the application byte-code with retained annotations to discover methods annotated as methods to be included in the API(s) of one or more designated microservice units. In some examples, the worker 208 may capture input and output parameters and request and response formats of the annotated methods.

At 312, the worker 208 may determine microservice units for containerization based on the application component annotations. For example, the worker 208 may analyze the discovered annotations and/or generate container definitions for microservice units based on the analysis of the application component annotations and method annotations. For example, the container definition for a microservice unit may specify the annotated application components, their dependencies, the methods to be exposed by the container API, and so on. Depending on the implementation and additional or alternative annotations that are utilized in the particular implementation, dependencies and/or configuration information may be identified and/or generated through further analysis. For example, the containerization service may perform a sandbox or similar analysis to detect additional dependencies not already included in a container definition for an annotated application component, such as the files, binaries, libraries, network and system calls of the application component. In addition, or alternatively, the user may be presented with the container definition(s) and/or the results of the analysis and may manually update the container definition(s).

At 314, the worker 208 may gather components for each designated microservice unit. Example components include executable files, configuration files, libraries, and binaries.

At 316, the worker 208 may build a container for each designated microservice unit. For example, the worker 208 may use metadata (e.g., the container definition and any other information derived from the discovery phase) and the components gathered at 314 to build a container image for the microservice unit. Though details are implementation specific, in general, the worker 208 may build the container image by generating a standalone, executable package that includes everything needed to run the microservice unit including the executables, dependencies and configuration information (e.g., code, runtime, system tools, system libraries, and settings).

At 318, the worker 208 may determine APIs and/or SDKs for each microservice unit based on the discovered annotated methods. For example, the worker 208 may determine API(s) or API model(s) for the microservice unit(s) based on the respective container definition(s) and/or the analysis of the method annotations. For example, an API model may be generated based on the input and output parameters of the annotated methods to be exposed by the API of the microservice unit. The APIs of each microservice unit may provide an interface to the functionality of the respective microservice unit to other applications or other microservice unit of the same containerized application. In some examples, API models may be in XML or JSON formats. Further, in some examples, API model(s) may be used to generate SDK(s) for the container(s) or microservice unit(s).

FIG. 4 illustrates a flow diagram of an example method 400 performed by a service provider network for application containerization based on annotations retained in during run-time according to some embodiments herein.

At 402, the service provider network 202 may receive a container or microservice unit including compiled annotated application byte code with runtime retention of annotations. The container image of the microservice unit may have been generated as discussed above with respect to FIG. 1-3.

At 404, the service provider network 202 may receive a launch request for the received container. At 406, the service provider network 202 may initiate a launch of the container. During launch of the container, the service provider network 202 may load an API specification of the container into memory at 408. In addition, at 410, the service provider network 202 may perform a component scan during the launch of the container to discover methods annotated as methods to be included in API(s) of the microservice unit of the container. The service provider network 202 may map the discovered methods to memory at 412.

At 414, the service provider network 202 may receive an API call from another application or another container of the same containerized application. In response, at 416, the service provider network 202 may dynamically determine the memory mapped method corresponding to API call based on the API specification and the annotations retained during runtime. The service provider network 202 may then perform the determined annotated method and, based on the outcome, respond to the API call at 418.

FIG. 5 illustrates a flow diagram of an example method 500 performed by a service provider network for application containerization based on a source code analysis of annotated source code according to some embodiments herein.

At 502, the containerization service 206 may receive annotated source code of an application to be containerized. In some examples, the containerization service 206 may store the received annotated source code at 216. At 504, the containerization service 206 may receive a containerization request via the console 204. For example, containerization request may designate the received annotated source code of the application to be containerized and initial information about the containerization.

At 506, the annotated source code may be parsed, for example, to generate an abstract syntax tree (AST). It should be noted that this discussion refers to ASTs during annotated source code analysis. However, other source code analysis artifacts that may capture relationships between annotations, application components and methods may be utilized in other examples. In particular examples, the containerization service 206 may provide the containerization request to a worker 208 for performance or configure a worker 208 to perform the containerization request. The worker 208 may then parse the annotated source code of the application to generate the AST.

At 508, the worker 208 may parse or traverse the AST to discover application components annotated for inclusion in one or more designated microservice units. As discussed above, annotations may designate microservice units using a label or tag (e.g., "microservice 1," "microservice 2," etc.). In some examples, annotations that designate application components for inclusion in one or more designated microservice units may indicate that the annotated application component includes at least part of the application programming interface (API) for a container of the containerized monolithic application and/or may indicate that the annotated application component is primary functionality of the associated container or microservice unit. The parsing of the AST may be performed as discussed above with regard to FIG. 1.

In examples in which the source code is analyzed directly to obtain application component and/or method annotations, a source code analysis tool may be utilized to obtain the annotations. For example, a tool such as ANTLR may be utilized to generate the Abstract Syntax Tree (AST) which may in turn be analyzed. The AST may be traversed to get all the annotations. In some examples, the annotations that designate application components for inclusion in one or more designated microservice units may also include information to produce the container image such as dependencies (e.g., other objects or components), a developer kit version, an application server type, port and other configuration information, and so on.

At 510, the worker 208 may traverse the AST to discover methods annotated as methods to be included in the API(s) of one or more designated microservice units. In some examples, the worker 208 may capture input and output parameters and request and response formats of the annotated methods.

At 512, the worker 208 may determine microservice units for containerization based on the application component annotations. For example, the worker 208 may analyze the discovered annotations and/or generate container definitions for microservice units based on the analysis of the application component annotations and method annotations. For example, the container definition for a microservice unit may specify the annotated application components, their dependencies, the methods to be exposed by the container API, and so on. Depending on the implementation and additional or alternative annotations that are utilized in the particular implementation, dependencies and/or configuration information may be identified and/or generated through further analysis. For example, the containerization service may perform a sandbox or similar analysis to detect additional dependencies not already included in a container definition for an annotated application component, such as the files, binaries, libraries, network and system calls of the application component. In addition, or alternatively, the user may be presented with the container definition(s) and/or the results of the analysis and may manually update the container definition(s).

At 514, the worker 208 may gather components for each designated microservice unit. Example components include executable files, configuration files, libraries, and binaries.

At 516, the worker 208 build a container for each designated microservice unit. For example, the worker 208 may use metadata (e.g., the container definition and any other information derived from the discovery phase) and the components gathered at 514 to build a container image for the microservice unit. Though details are implementation specific, in general, the worker may build the container image by generating a standalone, executable package that includes everything needed to run the microservice unit including the executables, dependencies and configuration information (e.g., code, runtime, system tools, system libraries, and settings).

At 518, the worker 208 may determine APIs and/or SDKs for each microservice unit based on the discovered annotated methods. For example, the worker 208 may determine API(s) or API model(s) for the microservice unit(s) based on the respective container definition(s) and/or the analysis of the method annotations. For example, an API model may be generated based on the input and output parameters of the annotated methods to be exposed by the API of the microservice unit. The APIs of each microservice unit may provide an interface to the functionality of the respective microservice unit to other applications or other microservice unit of the same containerized application. In some examples, API models may be in XML or JSON formats. Further, in some examples, API model(s) may be used to generate SDK(s) for the container(s) or microservice unit(s).

Figure 6:
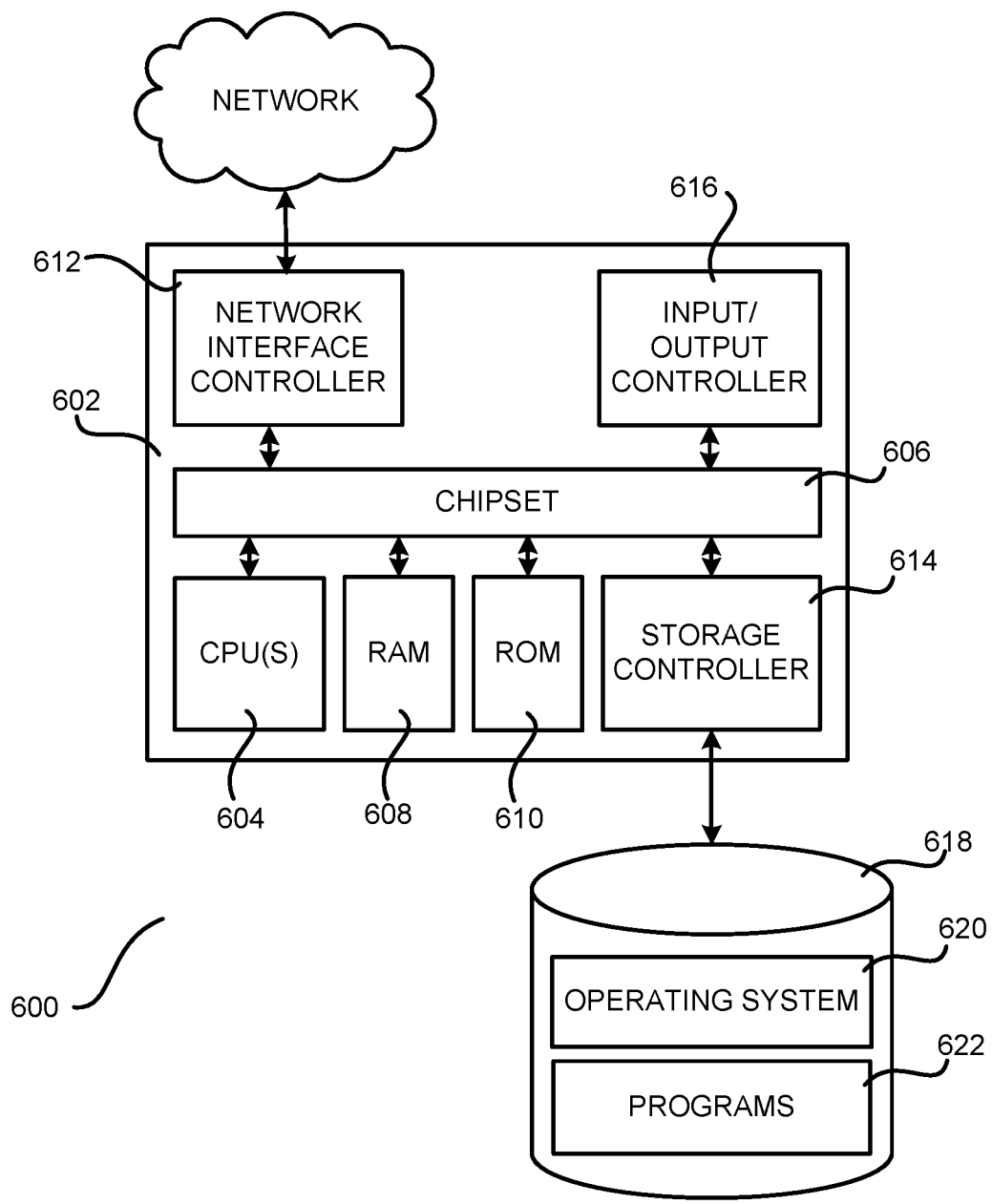
FIG. 6 is a computer architecture diagram showing an illustrative computer hardware architecture for implementing a computing device that can be utilized to implement aspects of the various technologies presented herein.

FIG. 6 shows an example computer architecture for a computer 600 capable of executing program components for implementing the functionality described above. The computer architecture shown in FIG. 6 illustrates a conventional server computer, workstation, desktop computer, laptop, tablet, network appliance, e-reader, smartphone, or other computing device, and may be utilized to execute any of the software components presented herein. For example, each of the console 204 and service provider network 202 may include one or more computers 600 that implement the above described functionality.

The computer 600 includes a baseboard 602, or "motherboard," which is a printed circuit board to which a multitude of components or devices may be connected by way of a system bus or other electrical communication paths. In one illustrative configuration, one or more central processing units ("CPUs") 604 operate in conjunction with a chipset 606. The CPUs 604 may be standard programmable processors that perform arithmetic and logical operations necessary for the operation of the computer 600.

The CPUs 604 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 may provide an interface to a RAM 608, used as the main memory in the computer 600. The chipset 606 may further provide an interface to a computer-readable storage medium such as a read-only memory ("ROM") 610 or non-volatile RAM ("NVRAM") for storing basic routines that help to startup the computer 600 and to transfer information between the various components and devices. The ROM 610 or NVRAM may also store other software components necessary for the operation of the computer 600 in accordance with the configurations described herein.

The computer 600 may operate in a networked environment using logical connections to remote computing devices and computer systems through a network, such as the external network or the local area network. The chipset 606 may include functionality for providing network connectivity through a NIC 612, such as a gigabit Ethernet adapter. The NIC 612 is capable of connecting the computer 600 to other computing devices over the networks. It should be appreciated that multiple NICs 612 may be present in the computer 600, connecting the computer to other types of networks and remote computer systems.

The computer 600 may be connected to a mass storage device 618 that provides non-volatile storage for the computer. The mass storage device 618 may store an operating system 620, programs 622, and data, which have been described in greater detail herein. The mass storage device 618 may be connected to the computer 600 through a storage controller 614 connected to the chipset 606. The mass storage device 618 may consist of one or more physical storage units. The storage controller 614 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 600 may store data on the mass storage device 618 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 618 is characterized as primary or secondary storage, and the like.

For example, the computer 600 may store information to the mass storage device 618 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 600 may further read information from the mass storage device 618 by detecting the physical states or characteristics of one or more particular locations within the physical storage units.

In addition to the mass storage device 618, the computer 600 may have access to other computer-readable storage media to store and retrieve information, such as program modules, data structures, or other data. It should be appreciated by those skilled in the art that computer-readable storage media is any available media that provides for the non-transitory storage of data and that may be accessed by the computer 600.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store information in a non-transitory fashion.

For purposes of the claims, the phrase "computer storage medium" and variations thereof, does not include waves, signals, and/or other transitory and/or intangible communication media, per se, and specifically excludes interpretations thereof which are prohibited by applicable statutory and case law.

As mentioned briefly above, the mass storage device 618 may store an operating system 620 utilized to control the operation of the computer 600. According to an example configuration, the operating system comprises the LINUX operating system. According to another configuration, the operating system comprises the WINDOWS® SERVER operating system from MICROSOFT Corporation. According to further configurations, the operating system may comprise the UNIX operating system or one of its variants.

It should be appreciated that other operating systems may also be utilized. The mass storage device 618 may store other system or application programs and data utilized by the computer 600.

In an example configuration, the mass storage device 618 or other computer-readable storage media is encoded with computer-executable instructions which, when loaded into the computer 600, transform the computer from a general-purpose computing system into a special-purpose computer capable of implementing the configurations described herein. These computer-executable instructions transform the computer 600 by specifying how the CPUs 604 transition between states. According to an example configuration, the computer 600 has access to computer-readable storage media storing computer-executable instructions which, when executed by the computer 600, perform the various processes described above. The computer 600 might also include computer-readable storage media for performing any of the other computer-implemented operations described herein.

The computer 600 may also include one or more input/output controllers 616 for receiving and processing input from a number of input devices, such as a keyboard, a mouse, a touchpad, a touch screen, an electronic stylus, or other type of input device. Similarly, an input/output controller 616 may provide output to a display, such as a computer monitor, a flat-panel display, a digital projector, a printer, a plotter, or other type of output device. It will be appreciated that the computer 600 may not include all of the components shown in FIG. 6, may include other components that are not explicitly shown in FIG. 6, or may utilize an architecture completely different than that shown in FIG. 6.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Moreover, various portions of the containerization techniques discussed herein may be utilized separately from other portions. For example, some implementations may utilize the cooperating process determination technique discussed above without the dependency detection techniques discussed above or vice versa. Other variations are possible.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A system comprising:
one or more processors; and
one or more computer-readable media storing computer-executable instructions that, when executed by the one or more processors, cause the one or more processors to:
receive annotated JAVA source code, of a monolithic legacy application, including one or more annotations designated to be retained after compiling of the annotated JAVA source code;
compile the annotated JAVA source code of the monolithic legacy application to generate annotated byte code;
parse the annotated byte code to:
identify one or more class annotations included in the annotated byte code; and
identify one or more method annotations included in the annotated byte code;
analyze the one or more class annotations to identify a class, associated with the monolithic legacy application, to be included in a container associated with a containerized version of the monolithic legacy application;
analyze the one or more method annotations to identify one or more methods, of the class identified based on the one or more class annotations, to be exposed in an application programming interface (API) for the container;
determine one or more dependencies of the class identified based on the one or more class annotations;
generate one or more container definitions based on at least one of the one or more class annotations or the one or more method annotations, the one or more container definitions designating a purpose for the container, components to be included in the container, and methods exposed by the API;
build the container based on the class, the one or more dependencies, and the one or more container definitions;
generate the API for the container based on the one or more methods identified based on the one or more method annotations; and
cause, based on the API, the container to be deployed to one or more computing resources hosted by a service provider network that is separate from, and different than, the monolithic legacy application.

2. The system of claim 1, wherein the determining of the one or more dependencies of the class is performed based on additional annotations included in the annotated byte code.

3. The system of claim 1, wherein:
one or more first class annotations of the one or more class annotations include a first designation associated with the container;
one or more second class annotations of the one or more class annotations include a second designation associated with a second container associated with the containerized version of the monolithic legacy application; and
the API exposes the one or more methods to the second container.

4. The system of claim 1, wherein:
the analyzing of the one or more class annotations determines a second class associated with the monolithic legacy application, the second class to be included in the container;
the analyzing of the one or more method annotations identifies one or more second methods of the second class, the one or more second methods to be exposed in the API;
the determining of the one or more dependencies further determines one or more second dependencies of the second class;
the building of the container is further based on the second class and the one or more second dependencies; and
the generating of the API is further based on the one or more second methods.

5. A computer-implemented method comprising:
receiving annotated source code of an application to be containerized;
analyzing one or more application component annotations included in the annotated source code to identify an application component, of the application, to be included in a container associated with a containerized version of the application;
analyzing one or more method annotations included in the annotated source code to identify one or more methods, of the application component, to be exposed in an application programming interface (API) for the container;
building the container including the application component;
generating the API for the container, based at least in part on the one or more methods; and
causing, based at least in part on the API, the container to be deployed to one or more computing resources hosted by a service provider network that is separate from, and different than, a source of the application.

6. The computer-implemented method of claim 5, wherein:
one or more first application component annotations associated with the application component include a first designation associated with the container;
one or more second application component annotations of the one or more application component annotations include a second designation associated with a second container associated with the containerized version of the application; and
the API exposes the one or more methods to the second container.

7. The computer-implemented method of claim 5, further comprising:
analyzing one or more additional annotations included in the annotated source code to determine one or more dependencies of the application component,
wherein the building of the container includes building the container to further include the one or more dependencies.

8. The computer-implemented method of claim 5, wherein:
one or more first application component annotations, of the one or more application component annotations included in the annotated source code, are associated with the application component;
the one or more first application component annotations designate the application component as including functionality to be exposed by the API; and
the analyzing of the one or more method annotations to identify the one or more methods is performed at least partly in response to identifying that the application component is to be included in the container.

9. The computer-implemented method of claim 5, wherein the one or more application component annotations and the one or more method annotations are designated to be retained after compiling of the annotated source code, the method further comprising:
compiling the annotated source code to generate annotated byte code,
wherein the analyzing the one or more application component annotations and the analyzing the one or more method annotations are performed based at least in part by parsing the annotated byte code to:
identify the one or more application component annotations within the annotated byte code; and
identify the one or more method annotations within the annotated byte code.

10. The computer-implemented method of claim 5, wherein the one or more method annotations are designated to be retained after compiling of the annotated source code and during runtime of the containerized version of the application, the method further comprising:
compiling the annotated source code to generate annotated byte code, wherein the building of the container is based at least in part on the annotated byte code; and
launching the container,
wherein the generating of the API is performed dynamically at least partly in response to the launching of the container.

11. The computer-implemented method of claim 5, wherein the analyzing the one or more application component annotations and the analyzing the one or more method annotations are performed at least in part by:
analyzing the annotated source code to build an abstract syntax tree; and
parsing the abstract syntax tree to:
identify the one or more application component annotations within the annotated source code; and
identify the one or more method annotations within the annotated source code.

12. The computer-implemented method of claim 5, wherein:
the analyzing of the one or more application component annotations identifies a second application component that is to be included in the container;
the analyzing of the one or more method annotations identifies one or more second methods, of the second application component, to be exposed in the API;
the building of the container is further based at least in part on the second application component; and
the generating of the API is further based at least in part on the one or more second methods.

13. A system comprising:
one or more processors; and
one or more computer-readable media storing computer-executable instructions that, when executed by the one or more processors, cause the one or more processors to:
receive annotated source code of an application to be containerized;
analyze one or more application component annotations included in the annotated source code to identify an application component, of the application, to be included in a container associated with a containerized version of the application;
analyze one or more method annotations included in the annotated source code to identify one or more methods, of the application component, to be exposed in an application programming interface (API) for the container;
generate one or more container definitions based at least in part on at least one of the application component or the one or more methods, the one or more container definitions designating at least one of a purpose for the container, components to be included in the container, or methods exposed by the API;
build, based at least in part on the one or more container definitions, the container including the application component; and
generate the API for the container based at least in part on the one or more methods.

14. The system of claim 13, wherein:
one or more first application component annotations associated with the application component include a first designation associated with the container;
one or more second application component annotations of the one or more application component annotations include a second designation associated with a second container associated with the containerized version of the application; and
the API exposes the one or more methods to the second container.

15. The system of claim 13, further comprising further instructions that, when executed by the one or more processors, cause the one or more processors to:
analyze one or more additional annotations included in the annotated source code to determine one or more dependencies of the application component,
wherein the building of the container includes building the container to further include the one or more dependencies.

16. The system of claim 13, wherein:
one or more first application component annotations, of the one or more application component annotations included in the annotated source code, are associated with the application component;
the one or more first application component annotations designate the application component as including functionality to be exposed by the API; and
the analyzing of the one or more method annotations included in the annotated source code to identify the one or more methods is performed at least partly in response to identifying that the application component is to be included in the container.

17. The system of claim 13, wherein the one or more application component annotations and the one or more method annotations are designated to be retained after compiling of the annotated source code, the system comprising further instructions that, when executed by the one or more processors, cause the one or more processors to:
compile the annotated source code to generate annotated byte code,
wherein the analyzing the one or more application component annotations and the analyzing the one or more method annotations are performed based at least in part by parsing the annotated byte code to:
identify the one or more application component annotations within the annotated byte code; and
identify the one or more method annotations within the annotated byte code.

18. The system of claim 13, wherein the one or more method annotations are designated to be retained after compiling of the annotated source code and during runtime of the containerized version of the application, the system comprising further instructions that, when executed by the one or more processors, cause the one or more processors to:
compile the annotated source code to generate annotated byte code, wherein the building of the container is based at least in part on the annotated byte code; and
launch the container,
wherein the generating of the API is performed dynamically at least partly in response to the launching of the container.

19. The system of claim 13, wherein the analyzing the one or more application component annotations and the analyzing the one or more method annotations are performed based at least in part by:
analyzing the annotated source code to build an abstract syntax tree; and
parsing the abstract syntax tree to:
identify the one or more application component annotations within the annotated source code; and
identify the one or more method annotations within the annotated source code.

20. The computer-implemented method of claim 5, wherein the application component is a class defined in the annotated source code, and the one or more methods are in the class.

* * * * *